UNITED STATES PATENT OFFICE.

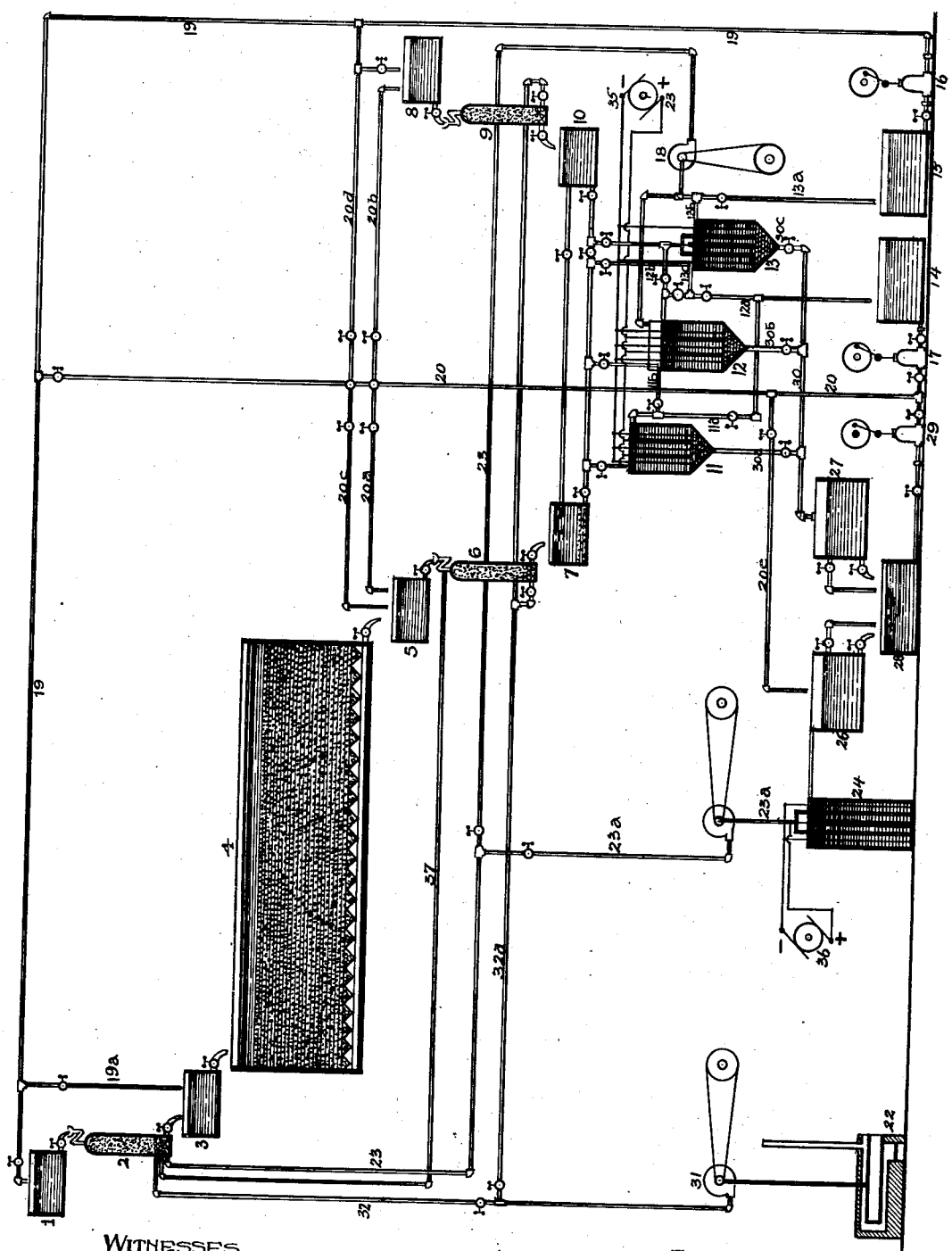

WILLIAM E. GREENAWALT, OF DENVER, COLORADO.

PROCESS OF EXTRACTING METALS FROM THEIR ORES.

973,776.  Specification of Letters Patent.  Patented Oct. 25, 1910.

Application filed May 25, 1909. Serial No. 498,328.

*To all whom it may concern:*

Be it known that I, WILLIAM E. GREENAWALT, a citizen of the United States, residing at Denver, in the county of Denver and State of Colorado, have invented certain new and useful Improvements in Processes of Extracting Metals from Their Ores, of which the following is a specification.

My invention relates to improvements in processes of extracting metals from their ores.

It will be described more particularly in its application to copper ores, and to ores containing copper with variable quantities of gold, silver, lead, nickel, cobalt, zinc, and other metals.

Copper ores usually contain variable quantities of other metals; and these metals cannot be recovered by any one of the wet methods now in use. One, and sometimes two, additional treatments are necessary to extract the gold and silver occurring with the copper, and the lead is invariably lost. One of the essential difficulties with acid processes has been, that the acid is usually too expensive to admit of extended use in mining districts, which are ordinarily located far from the source of acid supply. It takes approximately, 1.5 pounds of sulfuric acid to dissolve one pound of copper as sulfate. If hydrochloric acid is used, it takes approximately 0.6 pound of acid to extract one pound of copper as cuprous chlorid, and 1.1 pounds as cupric chlorid. Much of the acid, whether sulfuric or hydrochloric, combines with the base elements of the ore and serves no useful purpose. The amount of acid which it is necessary to provide, in any acid process, is considerably more than that combining with the copper, and all the acid is irrecoverably lost when iron is used as the precipitant. Theoretically, 88.8 pounds of iron are required to precipitate 100 pounds of copper from sulfate solutions. In practice, it takes from 200 to 300 pounds of scrap iron. Here, again, a large expense is incurred in providing iron with which to precipitate the copper. The fundamental difficulty, therefore, in treating copper ores in the past by these methods has been the excessive cost of the materials.

The essential object of my process is to reduce the costs and make the method commercially practicable.

In my electrolytic process, herewith described, the copper is dissolved by dilute acid chlorid solutions, and then precipitated by electrolysis, while at the same time the acid which was combined with the copper, is multiplied and again regenerated as free acid, at the expense of sulfur dioxid and water. Salt is the only chemical to provide, which is not usually contained in the ore. Sulfur dioxid, derived from roasting sulfid ore, is the active chemical consumed. Theoretically, the chlorin in the salt is not consumed, nevertheless, in practice, about one eighth pound of salt should be provided for every pound of copper produced.

The oxid, carbonate, and silicate ores of copper may be treated without roasting. The sulfids are roasted. If the ore is roasted, salt may be added during the roasting.

In working the process, the ore after being suitably crushed, is placed in large leaching vats for chemical treatment. The first step in the chemical process consists in combining chlorin, generated from metal chlorids by electrolysis, with sulfur dioxid produced by roasting concentrates or sulfid ore, in the presence of water, to form acid. This may be shown by the following reactions;—

(1) $2Cl + SO_2 + 2H_2O = H_2SO_4 + 2HCl$.
(2) $2HCl + CuO = CuCl_2 + H_2O$.
(3) $H_2SO_4 + CuO = CuSO_4 + H_2O$.

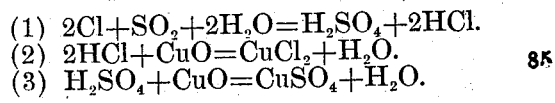

Both sulfuric acid and copper sulfate react with common salt to form hydrochloric acid or cupric chlorid, so that neither the sulfuric acid nor the copper sulfate could exist in the solution. These well known reactions are;—

(4) $H_2SO_4 + 2NaCl = 2HCl + Na_2SO_4$.
(5) $CuSO_4 + 2NaCl = CuCl_2 + Na_2SO_4$.

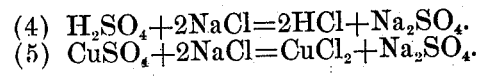

Cupric chlorid, when warm and in the presence of other metal chlorids, acts readily on silver and its compounds in the ore to form silver chlorid, thus;—

(6) $Ag + CuCl_2 = AgCl + CuCl$.

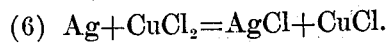

From 80% to 90% of the silver may in this way be extracted with the copper, especially if the ore is given a chloridizing roast. Lead is similarly extracted. If the ore contains considerable silver it is desirable to leach with a fairly concentrated solution of base metal chlorids.

The solubility of chlorin in water is limited. By the indirect method of combining the chlorin with sulfur dioxid and water to form acid, any desired strength of acid solution may be obtained for the copper, and a chlorin solution of sufficient strength for the gold.

The cupric chlorid solution issuing from the leaching vat, is saturated with sulfur dioxid obtained from roasting sulfid ore. This converts the cupric chlorid into the cuprous chlorid, thus;—

(7) $2CuCl_2 + SO_2 + 2H_2O = 2CuCl + 2HCl + H_2SO_4$.

The object of this is;—

First;—The electric current deposits twice as much copper, theoretically, per ampere, from a cuprous as from a cupric solution, and with an expenditure of only 65% of the energy per unit of copper.

Second:—The sulfur dioxid, reacting with cupric chlorid and water, produces large quantities of acid. A molecule of acid is in this way regenerated for every molecule of cupric chlorid reduced to cuprous chlorid. For every pound of copper reduced from the cupric to the cuprous condition, 1.4 pounds of acid is regenerated.

Third;—The excess of sulfur dioxid combines with the chlorin liberated during electrolysis of the cuprous chlorid to precipitate the copper, thereby again regenerating 1.4 pounds of acid for every pound of copper reduced from the cuprous condition to metallic copper. The reactions are;—

(8) $2CuCl + $ electric current $= 2Cu + 2Cl$.
(9) $2Cl + SO_2 + 2H_2O = 2HCl + H_2SO_4 + 75$. calories.

These reactions may take place in the electrolyzer. Usually the excess of chlorin will be conducted to a separate chamber where it may combine with the sulfur dioxid in the solution.

Fourth;—The above reactions give rise to an electromotive force working with the current, thereby reducing the necessary voltage in the deposition of the copper.

Fifth;—It dispenses with the necessity of diaphragms in the electrolyzers, although at times diaphragms may be desirable.

Sixth;—It is possible by this method, to extract the other valuable metals from the ore, with the copper, and with the same solution. This is not possible when working on a sulfate basis.

Seventh:—Insoluble anodes, decomposing chlorid solutions, are vastly more durable than when decomposing sulfates. Graphitized carbon electrodes have proved effective for the decomposition of chlorids, while the production of a suitable insoluble anode for the decomposition of sulfates, may still be regarded as one of the unsolved problems of electro-metallurgy.

It is evident, that in depositing one pound of copper, 2.8 pounds of acid is regenerated at the expense of sulfur dioxid and water. This amount of acid is capable of taking up twice the amount of copper from which it was decomposed. The regenerated acid solution is again applied to the ore, where some of the acid again combines with the copper, and some with the base elements, principally lime, forming the insoluble calcium sulfate, which remains in the ore. The sulfuric acid is the one which is eliminated by combining with the base elements, while the hydrochloric acid combines with the copper, again resulting in the formation of the original cupric chlorid. This cycle of solution, precipitation, and regeneration, is repeated indefinitely. When one vat of ore is sufficiently treated the solution is turned into the next. All the metal chlorids have the faculty of displacing copper from its sulfate combinations. For example, if there is lime in the ore, as there usually is, both the sulfuric and hydrochloric acids may combine with it. If the hydrochloric acid combines with the lime, the result will be the formation of calcium chlorid; but the calcium chlorid will at once react with the copper sulfate in the solution and convert it into the cupric chlorid, thus;—

(10) $2HCl + CaO = CaCl_2 + H_2O$.
(11) $CuSO_4 + CaCl_2 = CuCl_2 + CaSO_4$.

It is evident, therefore, that the sulfuric acid is the one which is eliminated by reacting with the base elements, and the sulfuric acid resolves itself back to the sulfur dioxid from the roasting furnace. The base metal chlorids act as a solvent for the silver chlorid.

If there is gold in the ore, the acid chlorid solution is charged with chlorin, generated, either from the copper chlorid, or from common salt, by electrolysis. It takes 1.7 pounds of salt to produce one pound of chlorin, and 5 pounds of chlorin will, ordinarily, extract the gold from a ton of the average copper ore. This chlorin is not lost, but is ultimately converted into base metal chlorid, in which form it is again used to extract the copper and silver from new charges of ore. Theoretically, none of the chlorin used in the process, whether free or combined, is lost. It simply changes its condition from acid chlorid in the leaching vats, and is again regenerated back to acid by the electrolysis.

It is intended, primarily, to work the process with impure solutions. Any electrolytic method, depending on pure solutions for success, must of necessity be very unsatisfactory. Nevertheless, in time, the solution may contain sufficient undesirable elements to make their removal advisable. The elements most injurious to copper, are bismuth, arsenic, and antimony. These, together with all the metals of the first and second groups may be completely removed from acid solutions by hydrogen sulfid and at the same time regenerate an amount of acid equivalent to the metals precipitated. Should a more thorough purification be desired, the following method is preferred;—
Salt, NaCl, is electrolyzed to produce chlorin and caustic soda, thus;—

(12) $NaCl+H_2O+$ electric current $=$
$$Cl+NaOH+H.$$

The chlorin so obtained may be used to dissolve the gold if there is any in the ore, or it may be converted into acid, thus;—

(13) $2Cl+SO_2+2H_2O+2NaCl=$
$$4HCl+Na_2SO_4,$$

which is used to dissolve more copper from the ore. The caustic soda is used to purify the solution by precipitating out the base elements, thus;—

(14) $RCl_2+2NaOH=2NaCl+R(OH)_2.$

After which the purified solution, regenerated in salt, is filtered from the precipitated hydroxids.

The acid chlorid solution, as applied to the ore, will issue from the leaching vats bearing the copper as cupric chlorid, although small quantities of cuprous chlorid may also be present. This solution may be passed directly through the electrolytic cells, but it is very much better to first bring it in contact with sulfur dioxid before electrolyzing it. If a diaphragm is used in the electrolysis of the cuprous chlorid, the solution is first passed through the negative compartment of the cell where it is freed or partially freed from its copper, and then passed through the anode compartment in which the solution is brought to a higher state of chlorination and considerable free chlorin may be given off. This chlorin is conducted to a scrubbing tower, or combining chamber, where it may combine with sulfur dioxid in the presence of the solution, (i. e. water) to form acid, or it may be retained in the solution as free chlorin for the extraction of the gold should there be any in the ore.

In electrolyzing the cuprous chlorid, it is desirable that sulfur dioxid should be present in excess, especially if an open cell is used, to prevent the liberated chlorin from reconverting the cuprous-chlorid into the cupric chlorid. So long as there is an excess of sulfur dioxid in the solution this cannot occur. It is evident, however, that it is desirable to return the solution to the ore, free from sulfur dioxid, and in the highest state of chlorination. This is accomplished either by a diaphragm cell, or by conducting the free chlorin, liberated during electrolysis at the anodes, into a separate chamber, where it may combine with the excess of sulfur diox . in the solution, after electrolysis, or if there is no excess of sulfur dioxid, it may combine with the lower chlorid salts to convert them into a higher state of chlorination.

The copper, by this electrolytic method, may be deposited in a granular condition, and does not adhere to the cathodes. The gold and silver occurring in the ore, with the copper, may be deposited with the copper, or separately, if desired. If the copper needs electrolytic refining, there would be no advantage in depositing the metals separately.

Having now explained the chemical reactions and general principles of the process, I will describe in detail, a practical apparatus for carrying it out.

Reference is made to the accompanying drawing, in which—

1 is a storage and regulating tank containing water, or preferably, a chlorid solution.

2 is a scrubbing tower, or combining chamber, having for its object the subdivision of the chlorid solution, while chlorin and sulfur dioxid are brought in contact with it. The chlorid solution slowly drips down through the tower while the chlorin and sulfur dioxid pass upwardly, when the reaction, shown by equation (1) takes place. The subdividing of the solution greatly facilitates the reaction. The dilute acid chlorid solution, issuing from the tower, flows into the storage and regulating tank 3, from whence it is drawn into the leaching vat as desired.

4 is a leaching vat, containing the ore to be treated. An agitator would do quite as well as the leaching vat, but this point is immaterial in the operation of the process.

The solution, percolating through the ore, reacts with the copper compounds, as shown by equations (2) and (3), and then issues from the vat 4, as a solution of cupric chlorid containing also, perhaps, some cuprous chlorid, and flows into storage and regulating tank 5, from which it can be passed through the scrubbing tower 6, in an even and continuous stream. The scrubbing tower, or reducing chamber, 6, is constructed similar to the combining tower, 2, and like that, connects with the sulfur dioxid generator, 22. The solution, containing the copper, mostly as cupric chlorid, dripping down through the reducing tower 6, while in contact with sulfur dioxid, forms a ready means of converting the cupric chlorid into the cuprous chlorid, according to the reaction shown by equation (7).

The partly regenerated acid cuprous chlorid solution, which will also usually contain an excess of sulfur dioxid, flows into storage and regulating tank 7, from whence it may be drawn into the electrolytic copper precipitating cells, 11, 12, and 13, as desired. In electrolytically depositing the copper, it will ordinarily be found most satisfactory to first pass the solution through open cells, that is to say cells without a diaphragm, as shown by 11 and 12, while maintaining an excess of sulfur dioxide in the solution, and then passing it through diaphragm cells as shown by 13.

The solution from the storage tank 7, flows in an even and continuous stream into electrolyzer 11, where it circulates freely about the cathodes and anodes, the copper being deposited on the cathode, while chlorin is being liberated at the anodes. Some of this chlorin immediately combines with the excess of sulfur dioxid, thus regenerating acid, and preventing the cuprous copper from becoming cupric. The solution, partly deprived of its copper, and presumably, most of its sulfur dioxid, flows out of the electrolyzer 11, through pipe 11ª, into tank 14, from whence it is elevated by means of pump 17 and pipe lines 20 and 20ᵇ, into tank 8. It then again percolates through tower 9, in the presence of sulfur dioxid, so that the solution on flowing into tank 10, and thence into electrolyzer 12, again contains sufficient excess of sulfur dioxid to combine with much of the liberated chlorin and prevent the solution from becoming cupric. If the solution, issuing from electrolyzer 11 still contains a sufficient excess of sulfur dioxid, it will not be necessary to pass it through tower 9, but may be flowed by means of pipe 11ᵇ directly into electrolyzer 12. In the same way the solution, issuing from electrolyzer 12, may be passed into electrolyzer 13, which is represented as a diaphragm cell with a closed anode compartment. The solution for the anode compartment of this cell may be taken directly from electrolyzer 12, or from the cathode compartment of the same cell, but the solution from the cathode compartment, is preferably again charged with sulfur dioxid, as for cell 12, to make sure that all the copper in the cathode solution is in the cuprous condition. The drawing clearly shows the various methods of circulating the solution, as necessity may arise, so that further verbal description will be superfluous.
If it is found that the sulfur dioxid is not all taken up in the reducing tower 6, the excess may be piped, by means of pipe line 37, to the bottom of the combining tower 2, where it may combine with the excess of chlorin, liberated during electrolysis.

The solution issuing from the cathode compartment of electrolyzer 13, largely freed from its copper, overflows through pipe 13ᶜ and into tank 14, from whence it is again elevated and enters the anode compartment of the cell. Or if the diaphragm is permeable, the solution may be passed through it from the cathode to the anode compartment.

The solution and chlorin from the anode compartment pass out through pipe 13ᵇ; the solution flowing through the pipe 13ª, enters the storage tank 15, from whence, by means of pump 16 and pipe 19, it is returned to storage tank 1 to again repeat the cycle as already described. The chlorin, by means of exhauster 18, and pipe line 23, is forced into the combining tower 2, where it again comes in contact with the solution and sulfur dioxid to form acid. If the solution is sufficiently acid it may at once be passed through the ore, by means of branch pipe 19ª, without going through the combining tower 2. If it is desired to treat the ore for gold, the solution is passed through the combining tower 2, but only in the presence of chlorin. The sulfur dioxid may be temporarily shut off.

The chlorin may be derived entirely from the electrolytic decomposition of the copper chlorid, as shown in cells 11, 12, and 13, or it may partly be derived from the decomposition of salt in a separate apparatus, as shown at 24. This represents an ordinary diaphragm cell for the electrolytic decomposition of sodium chlorid, into chlorin and caustic soda. The chlorin, by means of exhauster 25, and pipe line 23ª and 23, is forced into the combining tower 2, where it is absorbed by the solution. The caustic soda (or carbonate) flows into tank 26, where it comes in contact with a portion of the copper solution, when by equation (14) the solution is purified by throwing out the base elements, and again regenerating sodium chlorid. The purified solution is then filtered from the precipitate and again returned to the circuit, by means of tank 28 and pump 29.

In depositing the copper in the electrolyzers 11, 12, and 13, it has been found that when there is an excess of sulfur dioxid in the solution, the deposited copper will not adhere to the cathodes, but falls to the bottom of the electrolyzers. To facilitate the gathering of the copper, and preventing of short circuits between the electrodes, the cells are constructed with a hopper bottom, in which the copper accumulates. In the bottom of these hoppers, at the apex, are pipes 30ª, 30ᵇ, and 30ᶜ, having valves and connecting with the main 30, which leads to a settling tank 27. The copper soon settles to the bottom, and leaves the clear solution on top. This solution is then drawn off into tank 28 and returned to the circuit. When sufficient copper has accumulated in the copper settling tank 27, it is washed, removed, charged into a furnace, melted and cast into ingots, or into anodes for electrolytic refining, and for the separation of the copper from the precious metals.

The sulfur dioxid furnace is shown at 22, and by means of the exhauster 31 and the pipe lines 32 and 32ª, the sulfur dioxid is delivered to the various towers, 2, 6 and 9.

35 represents the electric generator furnishing electricity to the electrolyzers 11, 12, and 13.

36 represents the generator furnishing electricity to the chlorin cells 24. The method of electrically connecting these cells is well understood and need not be described in further detail.

18 represents the exhauster for the copper cells, and forces the chlorin exhausted from those cells into the combining tower 2.

In the electrolytic decomposition of the copper it is best not to attempt to get the solution below 0.5% or 1.0% copper. Much of this remaining copper, after issuing from the electrolyzers may be in the cuprous condition. Before returning it to the ore it is desirable to first pass the solution through the combining tower 2, in the presence of chlorin, so that the cuprous chlorid still remaining in the solution will be converted into the cupric chlorid.

The current which it is desirable to employ, 50 amperes per square foot, makes it impossible to combine all of the chlorin released at the anode with the sulfur dioxid in the solution, during electrolysis. It is desirable, therefore, to exhaust the chlorin from the electrolyzers and force it into the combining tower 2, where it may come in contact with the excess of sulfur dioxid in the solution, or the excess from the reducing tower 6, or fresh sulfur dioxid from the generator 22.

The sulfur dioxid generator 22, may be a furnace, a sulfur burner, or any other means of generating the gas. Ordinarily it will be a muffle furnace, in which the ore is first roasted for its sulfur content, and then charged into leaching vats for the extraction of the copper.

Cuprous chlorid is not soluble in water. Neither is silver chlorid. If an attempt were made to convert the cupric chlorid into the cuprous chlorid, without the presence of other chlorids, the cuprous chlorid would be precipitated. It is for this reason that a chlorid solution is used, since both cuprous and silver chlorids are soluble in chlorid solutions. A chlorid solution of sufficient strength is, therefore, used to retain the cuprous chlorid in solution.

The slight and unessential modifications of the process and apparatus to treat other metals than those specifically mentioned will be evident to any one skilled in the art, so that it will be useless and unnecessary to give a detailed description for each particular metal.

The granulation of the deposited copper appears to be affected both by the current density employed and by the amount of sulfur dioxid in the solution. By regulating these factors, any desired granulation of the copper may be obtained.

Having thus described my invention, what I claim, is:—

1. A process of extracting copper from its ores which consists in treating the ore with an acid solution to dissolve the copper; applying sulfur dioxid to the resulting copper solution in the presence of some other chlorid to convert the dissolved copper into the cuprous chlorid; electrolyzing the resulting solution, containing the cuprous chlorid, to deposit the copper and liberate chlorin; bringing the chlorin so liberated in contact with the solution in the presence of sulfur dioxid; returning the regenerated acid solution to the ore and repeating the cycle of solution, precipitation and regeneration, as before, until the copper in the ore is sufficiently extracted.

2. A process of extracting copper from its ores which consists in treating the ore with an acid solution to dissolve the copper; applying sulfur dioxid to the resulting copper solution in the presence of a metal chlorid to convert the dissolved copper into the cuprous chlorid; electrolyzing the cuprous chlorid to deposit the copper and liberate chlorin; subdividing the solution; then bringing the chlorin, liberated by the decomposition of the cuprous chlorid, in contact with the solution while in a state of subdivision, in the presence of sulfur dioxid; returning the regenerated acid solution to the ore and repeating the cycle, as before, until the copper in the ore is sufficiently extracted.

3. A process of extracting copper from its ores containing other metals which consists in treating the ore with an acid solution to dissolve the copper and other metals; applying sulfur dioxid to the resulting copper solution in the presence of other chlorids to convert the dissolved copper into cuprous chlorid; electrolyzing the resulting solution, containing the cuprous chlorid, to deposit the copper and liberate chlorin; bringing the chlorin so liberated in contact with the solution in the presence of sulfur dioxid; returning the regenerated acid solution to the ore and repeating the cycle of solution, precipitation and regeneration, as before, until the copper and other metals in the ore are sufficiently extracted.

4. A process of extracting metals from their ores containing copper which consists in treating the ore with an acid solution to dissolve the copper and other metals; applying sulfur dioxid to the solution in the presence of a metal chlorid; electrolyzing the cuprous and other metal chlorids to deposit the copper and other metals and liberate chlorin; subdividing the solution; then bringing the chlorin so liberated in contact with the solution in the presence of sulfur dioxid; returning the regenerated acid solution to the ore, and repeating the cycle as before, until the metals in the ore are sufficiently extracted.

5. A process of extracting metals from their ores containing copper which consists in treating the ore with an acid solution to dissolve the copper and other metals; applying sulfur dioxid to the resulting copper solution in the presence of other chlorids to convert the dissolved copper into cuprous chlorid; electrolyzing the resulting solution, containing the cuprous chlorid, to deposit the copper and liberate chlorin; bringing the chlorin so liberated in contact with water in the presence of sulfur dioxid; applying the resulting acid solution to the ore, and repeating the cycle, as before, until the copper in the ore is sufficiently extracted.

6. A process of extracting copper from its ores which consists in treating the ore with an acid chlorid solution to dissolve the copper; applying sulfur dioxid to the resulting copper solution to convert the cupric chlorid into the cuprous chlorid; electrolyzing the resulting solution, containing the cuprous chlorid, to deposit the copper and liberate chlorin; bringing the chlorin so liberated in contact with the solution in the presence of sulfur dioxid; returning the regenerated acid solution to the ore, and repeating the cycle, as before, until the copper in the ore is sufficiently extracted.

7. A process of extracting copper from its ores which consists in treating the ore with an acid chlorid solution to dissolve the copper; applying sulfur dioxid to the resulting copper solution to convert the cupric chlorid into the cuprous chlorid; electrolyzing the cuprous chlorid to deposit the copper and liberate chlorin; subdividing the solution; then bringing the chlorin so liberated, in contact with the solution while in a state of subdivision, in the presence of sulfur dioxid; returning the regenerated acid solution to the ore and repeating the cycle, as before, until the copper in the ore is sufficiently extracted.

8. A process of extracting copper from its ores which consists in treating the ore with an acid chlorid solution to dissolve the copper; electrolyzing the resulting copper chlorid, first as the catholyte; then as the anolyte; bringing the chlorin released by the decomposition of the copper chlorid in contact with the solution in the presence of sulfur dioxid; returning the regenerated acid solution to the ore and repeating the cycle, as before, until the copper in the ore is sufficiently extracted.

9. A process of extracting copper from its ores which consists in treating the ore with an acid solution to dissolve the copper; applying sulfur dioxid to the resulting copper solution in the presence of a metal chlorid to convert the dissolved copper into the cuprous chlorid; electrolyzing the cuprous chlorid to deposit the copper and liberate chlorin, first as the catholyte; then as the anolyte; bringing the chlorin released by the decomposition of the cuprous chlorid in contact with the solution in the presence of sulfur dioxid; returning the regenerated acid solution to the ore and repeating the cycle, as before, until the copper in the ore is sufficiently extracted.

10. A process of extracting copper from its ores which consists in treating the ore with an acid chlorid solution to dissolve the copper; passing the chlorid solution containing the copper through the negative compartment of an electrolytic cell to deposit the copper and liberate chlorin; passing the solution, after issuing from the negative compartment, through the positive compartment; exhausting the chlorin released in the positive compartment and bringing it in contact with the solution in the presence of sulfur dioxid; returning the solution to the ore and repeating the cycle, as before, until the copper in the ore is sufficiently extracted.

11. A process of extracting copper from its ores which consists in treating the ore with an acid chlorid solution to dissolve the copper; applying sulfur dioxid to the solution to convert the cupric chlorid into the cuprous chlorid; passing the chlorid solution containing the copper through the cathode compartment of an electrolytic cell to deposit the copper; passing the solution, after issuing from the cathode compartment, through the anode compartment; subdividing the solution; bringing the chlorin liberated in the anode compartment by the decomposition of the cuprous chlorid, in contact with the solution and sulfur dioxid while in a state of subdivision; returning the regenerated acid solution to the ore and repeating the cycle, as before, until the copper in the ore is sufficiently extracted.

12. A process of extracting copper from its ores containing other metals which consists in treating the ore with an acid chlorid solution to dissolve the copper and other metals; applying sulfur dioxid to convert the cupric chlorid into the cuprous chlorid; electrolyzing the solution containing the cuprous chlorid and chlorids of the other metals to deposit the metals and liberate chlorin; subdividing the solution; conducting the liberated chlorin and sulfur dioxid into the presence of the subdivided solution; returning the regenerated acid solution to the ore and repeating the cycle until the metals in the ore are sufficiently extracted.

13. A process of extracting copper from its ores containing gold which consists in treating the ore with an acid chlorid solution to dissolve the copper; electrolyzing the resulting copper chlorid solution to deposit the copper and liberate chlorin; bringing the chlorin so liberated, in contact with the solution in the presence of sulfur dioxid; applying chlorin in excess of that combining with the sulfur dioxid, to the solution, to dissolve the gold; returning the regenerated acid chlorid chlorin solution to the ore, and repeating the cycle, as before, until the copper and gold in the ore are sufficiently extracted.

14. A process of extracting copper from its ores containing gold which consists in treating the ore with an acid chlorid solution to dissolve the copper; electrolyzing the resulting copper chlorid solution to deposit the copper and liberate chlorin; bringing the chlorin so liberated, in contact with the solution in the presence of sulfur dioxid; subdividing the solution; applying chlorin to the solution in excess of that combining with the sulfur dioxid to dissolve the gold; returning the regenerated acid solution, containing an excess of chlorin, to the ore, and repeating the cycle, as before, until the copper and gold in the ore are sufficiently extracted.

15. A process of extracting metals from their ores which consists in treating the ore with an acid chlorid solution to dissolve the metals as chlorids; electrolyzing the resulting extracting solution, containing the metal chlorids, to deposit the metals and liberate chlorin; exhausing the chlorin so liberated, from the electrolyzer, and bringing it in contact with the solution in the presence of sulfur dioxid; returning the regenerated acid solution to the ore, and repeating the cycle, as before, until the metals in the ore are sufficiently extracted.

16. A process of extracting metals from their ores which consists in treating the ore with an acid chlorid solution to dissolve the metals as chlorids; electrolyzing the metal chlorids to deposit the metals and liberate chlorin; subdividing the solution; then bringing the liberated chlorin in contact with the solution in the presence of sulfur dioxid; returning the regenerated acid solution to the ore, and repeating the cycle, as before, until the metals in the ore are sufficiently extracted.

17. A process of extracting copper from its ores which consists in treating the ore with an acid solution to dissolve the copper; filtering the solution from the ore; subdividing the solution; applying sulfur dioxid to the subdivided solution in the presence of a metal chlorid to convert the dissolved copper into the cuprous chlorid; electrolyzing the cuprous chlorid to deposit the copper and liberate chlorin; bringing the chlorin so liberated in contact with the solution in the presence of sulfur dioxid; returning the regenerated acid solution to the ore and repeating the cycle, as before, until the copper in the ore is sufficiently extracted.

18. A process of extracting copper from its ores which consists in treating the ore with an acid solution to dissolve the copper; filtering the solution from the ore; subdividing the solution; applying sulfur dioxid to the subdivided solution in the presence of a metal chlorid to convert the dissolved copper into the cuprous condition; electrolyzing the cuprous chlorid to deposit the copper and liberate chlorin; again subdividing the solution; and then bringing the chlorin, liberated by the decomposition of the cuprous chlorid, in contact with the solution in the presence of sulfur dioxid; returning the regenerated acid solution to the ore and repeating the cycle, as before, until the copper in the ore is sufficiently extracted.

19. A process of extracting copper from its ores which consists in treating the ore with an acid chlorid solution to dissolve the copper; applying sulfur dioxid to the solution to convert the cupric chlorid into the cuprous chlorid; maintaining sufficient sulfur dioxid in the solution to prevent the formation of cupric chlorid; electrolyzing the cuprous chlorid to deposit the copper and liberate chlorin; subdividing the solution; then bringing the excess of liberated chlorin in contact with the subdivided solution to bring it to a higher state of chlorination; returning the solution to the ore, and repeating the cycle as often as may be necessary until the copper in the ore is sufficiently extracted.

20. A process of extracting copper from its ores which consists in treating the ore with an acid chlorid solution to dissolve the copper; subdividing the solution in a suitable reducing chamber; applying sulfur dioxid to the subdivided solution to reduce the copper from the cupric to the cuprous condition; electrolyzing the cuprous chlorid to deposit the copper and liberate chlorin; subdividing the electrolyzed solution; bringing the chlorin liberated during electrolysis, in contact with the subdivided solution to bring it to a higher state of chlorination; returning the regenerated acid solution to the ore, and repeating the cycle, as before, until the copper in the ore is sufficiently extracted.

21. A process of extracting copper from its ores which consists in treating the ore with an acid chlorid solution to dissolve the copper; subdividing the solution in a suitable reducing chamber; applying sulfur dioxid to the subdivided solution to reduce the cupric chlorid to the cuprous chlorid; electrolyzing the cuprous chlorid to deposit the copper and liberate chlorin; conducting the excess of sulfur dioxid from the reducing chamber to the combining chamber; conducting the electrolyzed solution to the combining chamber; subdividing the solution; conducting the excess of liberated chlorin to the combining chamber where it comes in contact with the sulfur dioxid and subdivided solution; returning the regenerated acid solution to the ore, and repeating the cycle, as before, until the copper in the ore is sufficiently extracted.

22. A process of extracting copper from its ores which consists in electrolyzing the chlorid extracting solution to liberate chlorin and deposit the metals; combining the chlorin so liberated with sulfur dioxid and water to form acid, and then treating ores of copper with the acid solution so formed.

23. A process of extracting copper from its ores which consists in treating the ore with an acid chlorid solution to dissolve the copper; converting the dissolved copper in the extracting solution into the form of cuprous chlorid, and then electrolyzing the resulting solution, containing the cuprous chlorid, in the presence of a substance capable of preventing the formation of cupric chlorid.

24. A process of extracting copper from its ores which consists in treating the ore with an acid solution to dissolve the copper; converting the dissolved copper in the solution into the form of cuprous chlorid, and then electrolyzing the resulting solution containing the copper in its chlorid combination in the presence of sulfur dioxid while maintaining sufficient other chlorids in the solution to retain the cuprous chlorid in solution.

25. A process of extracting copper from its ores which consists in treating the ore with a suitable solvent to extract the copper; converting the cupric chlorid in the solvent into the cuprous chlorid by bringing the solution in contact with sulfur dioxid; maintaining sufficient other metal chlorid in the solution to retain the cuprous chlorid in solution; electrolyzing the cuprous chlorid solution to precipitate the copper and regenerate the solvent, and then applying the regenerated solvent to the ore to extract more copper.

26. A process of extracting copper from its ores containing other metals which consists in treating the ore with an acid chlorid solution to dissolve the copper and silver chlorid; applying sulfur dioxid to the solution to convert the cupric chlorid into the cuprous chlorid; electrolyzing the cuprous chlorid solution to deposit the copper; electrolyzing salt to generate chlorin and caustic soda; adding the chlorin to the solution to dissolve the gold and other metals contained in the ore; and from time to time adding the caustic soda to the solution to purify it by precipitating out the base elements and regenerating salt.

27. A process of extracting metals from their ores which consists in electrolyzing the metals in their chlorid combinations to deposit the metals and liberate chlorin, subdividing the solution after electrolysis, then bringing the liberated chlorin in contact with the solution while in a state of subdivision, and then treating ores of metals with the solution so formed.

WILLIAM E. GREENAWALT.

Witnesses:
JOHN G. MAY,
CORA M. GREENAWALT.